(12) United States Patent
Clave et al.

(10) Patent No.: US 6,557,097 B1
(45) Date of Patent: Apr. 29, 2003

(54) LINEAR VECTOR COMPUTATION

(75) Inventors: Gael Clave, Antibes (FR); Karim Djafarian, Vence (FR); Gilbert Laurenti, Saint Paul de Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,473

(22) Filed: Oct. 1, 1999

(30) Foreign Application Priority Data

Oct. 6, 1998 (EP) .............................................. 98402455
Oct. 6, 1998 (EP) .............................................. 98402465

(51) Int. Cl.$^7$ .............................................. G06F 17/16
(52) U.S. Cl. ....................... 712/222; 708/505; 708/670; 712/7
(58) Field of Search ................................ 708/505, 670; 712/7, 8, 9, 222, 241

(56) References Cited

U.S. PATENT DOCUMENTS

| | | | | |
|---|---|---|---|---|
| 5,227,994 A | * | 7/1993 | Ohki Mitsuharu | 708/603 |
| 5,623,650 A | * | 4/1997 | Beard et al. | 712/234 |
| 6,286,346 B1 | * | 9/2001 | Hocken, Jr. et al. | 710/260 |

FOREIGN PATENT DOCUMENTS

| | | | | |
|---|---|---|---|---|
| EP | WO 98 15056 A | 4/1998 | | H03H/7/30 |
| JP | 09 093426 | 8/1997 | | H04N/1/393 |

* cited by examiner

*Primary Examiner*—Kenneth S. Kim
(74) *Attorney, Agent, or Firm*—Gerald E. Laws; W. James Brady, III; Frederick J. Telecky, Jr.

(57) ABSTRACT

A processing engine 10 provides computation of an output vector as a linear combination of N input vectors with N coefficients in an efficient manner. The processing engine includes a coefficient register 940 for holding a representation of each of N coefficients of a first input vector. A test unit 950 is provided for testing selected parts (e.g. bits) of the coefficient register for respective coefficient representations. An arithmetic unit 970 computes respective coordinates of an output vector by selective addition/subtraction of coordinates of a second input vector dependent on results of the coefficient representation tests. Power consumption can be kept low due to the use of a coefficient test operation in parallel with an ALU operation. Each coordinate of an output vector $\vec{Y}$ can be computed with a N+1 step algorithm, the computation being done with bit test unit operating in parallel with an ALU according to the following equation:

$$\forall\, 1 \leq j \leq M \quad Y_j = \sum_{1 \leq i \leq N} ((-1)^{C_i} * X_{ij}).$$

At a step $(i+1)_{1 \leq i \leq N}$ of the computation, a bit $C_{i+1}$ of the CPU register is addressed, this bit is tested in a temporary register and a conditional addition/subtraction of a coordinate of the second input vector $X_{ij}$ is performed.

20 Claims, 8 Drawing Sheets

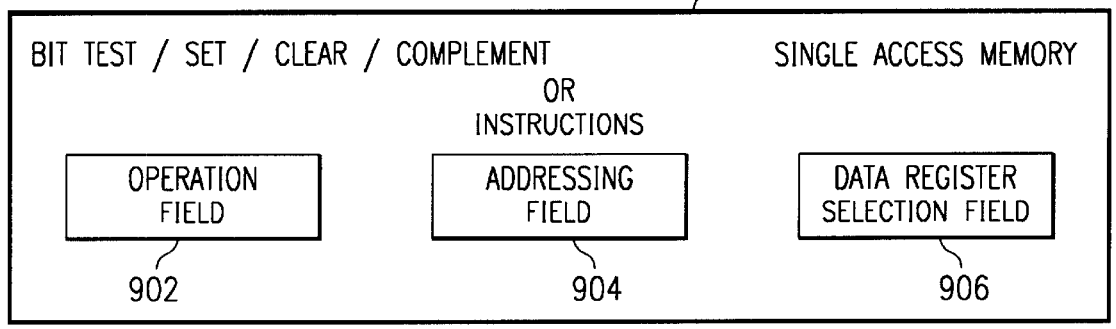
FIG. 8
FIG. 9
(PRIOR ART)
$$\vec{Y}\begin{bmatrix}\ \\ \ \end{bmatrix} = C\begin{bmatrix}\ \\ \ \end{bmatrix} * X\begin{bmatrix}\ \\ \ \end{bmatrix}$$
FIG. 10
$$\vec{Y}\begin{bmatrix}\ \\ \ \end{bmatrix} = {}^{+}_{-}1\begin{bmatrix}X_1 \\ \ \end{bmatrix} {}^{+}_{-}1\begin{bmatrix}X_2 \\ \ \end{bmatrix} \circ \circ \circ {}^{+}_{-}1\begin{bmatrix}X_N \\ \ \end{bmatrix}$$
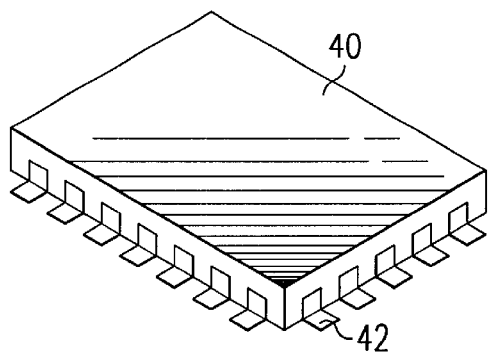
FIG. 13
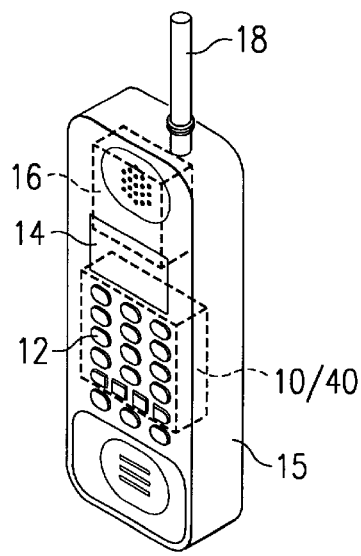
FIG. 14

LINEAR VECTOR COMPUTATION

This application claims priority to S.N. 98402465.3, filed in Europe on Oct. 6, 1998 (TI-27679EU) and S.N. 98402455.4, filed in Europe on Oct. 6, 1998 (TI-28433EU).

FIELD OF THE INVENTION

The present invention relates to the computation of linear vectors in a digital processing system.

BACKGROUND OF THE INVENTION

In particular, the invention relates to the computation of any vector $\vec{Y}$ defined as a linear combination of N vectors $(\vec{X}_i)_{1 \leq i \leq N}$ with N coefficients $$(C_i)_{1 \leq i \leq N} \in \{-1; +1\}: \vec{Y} = \sum_{1 \leq i \leq N} C_i * \vec{X}_i.$$

Some signal processing applications, for example processing operations for a GSM (Global System for Mobiles) half rate vocoder need effective algorithmic dependent processing on $(C_i)_{1 \leq i \leq N}$ coefficients. Examples of such processing operations are:

circular permutations of the coefficients; and complementing the value of a coefficient.

A typical digital signal processor (DSP) implementation will be effected as follows:

Firstly, the $(C_i)_{1 \leq i \leq N}$ coefficients are converted from a bit representation $(0, 1)$ to fractional numbers ($\frac{1}{2}$, $-\frac{1}{2}$) coded on multiple bits (16, 32, ...). Then each $\vec{Y}$ vector coordinate $(Y_j)_{1 \leq j \leq M}$ is computed with an N step algorithm. The computation is effected with a Multiply and Accumulate unit, as represented by the following equation:

$$\forall 1 \leq j \leq M \quad Y_j = \sum_{1 \leq i \leq N} ((C_i * X_{ij}) << 1),$$

where $(X_{ij})_{1 \leq j \leq M}$ are the coordinates of the vector $\vec{X}_i$ It will be noted that two memory operands ($C_i$, $X_{ij}$) and a multiplication operation are required for each step of the computation. The coefficient addressing is carried out using an address generation unit, with indirect memory addressing, for example circular post-modification addressing, as required.

The disadvantages of this known approach are that a large number of memory addressing operations and operand fetching operations are needed. This reduces the availability of the busses, and demands a high power consumption to drive all of the bus operations. The use of a multiplication operation also requires high power consumption.

In modern processing engine design, it is desirable to reduce power consumption, both for ecological and economic grounds. Particularly, but not exclusively, in mobile processing applications, for example mobile telecommunications applications, it is desirable to keep power consumption as low as possible without sacrificing performance more than is necessary.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a processing engine for computing an output vector as a linear combination of N input vectors with N coefficients. The processing engine comprises a coefficient register for holding a representation N coefficients for a first input vector. A test unit is provided for testing selected parts of the coefficient register for respective coefficient representations. An arithmetic unit is provided for computing respective coordinates of an output vector by selective addition and/or subtraction of input vector coordinates for a second input vector dependent on results of the tests on the coefficient representations.

An embodiment of the invention enables the achievement of a number of advantages with respect to the prior art as regards the computation of a combination of linear vectors.

Power consumption can be reduced with respect to a processing engine operating in accordance with the prior technique as described in the introduction, as a test instruction (e.g. a bit test instruction) in combination with an ALU instruction is used rather than a MAC instruction. Also, only one data memory access per step of the computation is required, rather than two data memory accesses.

Execution performance is broadly equivalent to that of a processing engine operating in accordance with the prior technique described in the introduction as there are no processor stalls due to memory resource access conflicts. Also a minimal overhead of one cycle can, if required, be hidden by providing for parallel execution.

Flexible addressing is provided in that an address generation unit can be used to generate memory addresses and bit addresses in CPU registers.

The hardware overhead is minimal.

In an embodiment of the invention:

$(C_i)_{1 \leq i \leq N}$ coefficients, represented as bits $(0, 1)$, for a first input vector are packed in a CPU register.

Each coordinate of an output vector $\vec{Y}$ is computed with a N+1 step algorithm.

The computation is done with bit test unit operating in parallel with an ALU unit:

$$\forall 1 \leq j \leq M \quad Y_j = \sum_{1 \leq i \leq N} (-(-1)^{C_i} * X_{ij})$$

At step $(i+1)_{1 \leq i \leq N}$ of the computation:

bit $C_{i+1}$ of the CPU register is addressed;

the tested bit is stored in a temporary register;

a conditional addition/subtraction of a coordinate of the second input vector $X_{ij}$ is performed based on the tested bit.

A test status register can be provided for storage of a coefficient test result prior to selective addition/subtraction of a coordinate of the second input vector dependent on the coefficient test result.

An address generator can be provided to generate a register bit pointer address for selecting a part (e.g., a bit position or a bit field) of the coefficient register holding an appropriate coefficient representation (e.g., one or more bits) for testing by the test unit. The same or a different address generator can also generate a memory address for retrieving a coordinate for the second input vector. Where the same data address generation hardware is used, this results in economical use of silicon and also of economies in power consumption in use. The coefficient register can include more than N bits. Circular bit addressing with post modification can be used to provide efficient use of the register, modifying the coefficients in a wrap round, or modulo manner.

A memory operand is fetched and a coefficient representation (e.g., a bit) is tested for each step of the computation. The test unit can be a bit test unit.

In an example of the invention, the bit test unit is operable in a step i+1 of a computation of a coordinate $\vec{Y}_j$ of a vector $\vec{Y}$ to test a coefficient $C_{i+1}$, and an arithmetic unit is operable in parallel therewith to perform a conditional addition/subtraction of an operand $X_{ij}$ dependent upon the result of a test on a bit $C_i$ of the coefficient register performed at a step i of the computation.

The computation of an output vector coordinate can thus be performed as a series of N+1 steps.

The processing engine can be in the form of a digital signal processor and can be integrated in an integrated circuit.

The invention also provides a telecommunications device comprising a data input device, a display, an antenna and a processing engine as defined above.

In accordance with another aspect of the invention, there is provided a method of computing an output vector as a linear combination of input vectors with N coefficients in a processing engine. The method comprises:

holding a representation of each of N coefficients of a first input vector in a coefficient register;

selectively testing respective coefficient representations of the first input vector; and computing coordinates of an output vector by selective addition and/or subtraction of coordinates of a second vector dependent on the results of testing the coefficient representations for the first input vector.

In an embodiment of the invention, the computation of a coordinate of an output vector $\vec{Y}$ is performed as a series of N+1 steps, wherein, at a step $(i+1)_{1 \leq i \leq N}$ of the computation:

a bit $C_{i+1}$, representative of a coefficient of the first input vector, is addressed in the coefficient register for testing that bit;

a tested bit is stored in a bit test result register; and one of a conditional addition and subtraction of an $X_{ij}$ coordinate of a second input vector is performed dependent on a bit stored in the bit test register as a result of a test on a bit $C_i$ of the coefficient register performed at a step i of the computation.

It will be noted that only one memory operand ($X_{ij}$) is required for each step of the computation. The coefficient addressing can be done through an address generation unit, with any indirect register bit addressing being used (for example circular post-modification).

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 8 is a schematic representation of a bit test instruction;

FIG. 9 is a conventional representation of a linear combination of vectors:

FIG. 10 is an alternative representation of the linear combination of vectors as performed in accordance with an embodiment of the invention;

FIG. 13 is a schematic representation of an integrated circuit incorporating the processor of FIG. 1; and FIG. 14 is a schematic representation of a telecommunications device incorporating the processor of FIG. 1.

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
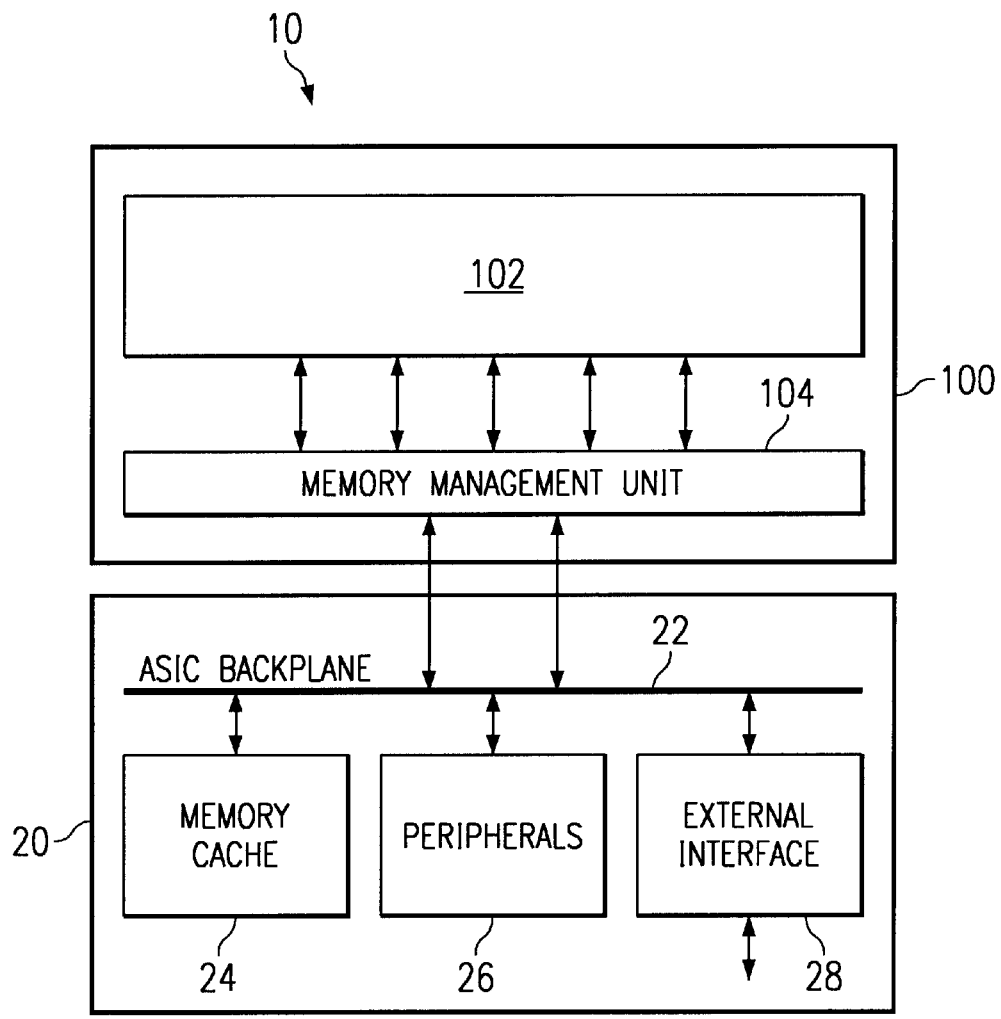
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977, which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
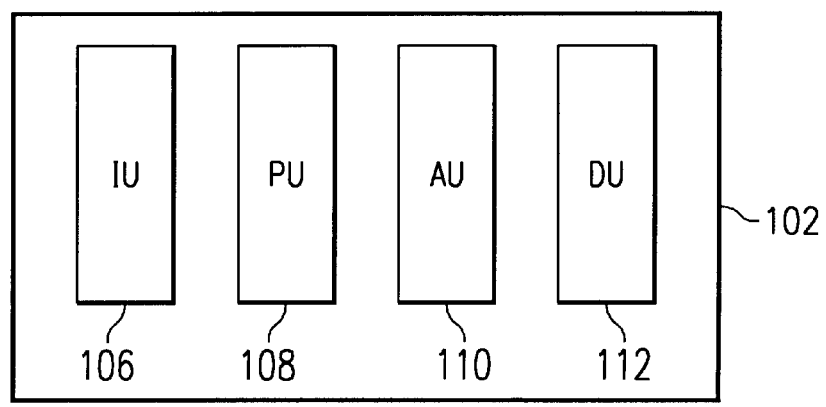
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
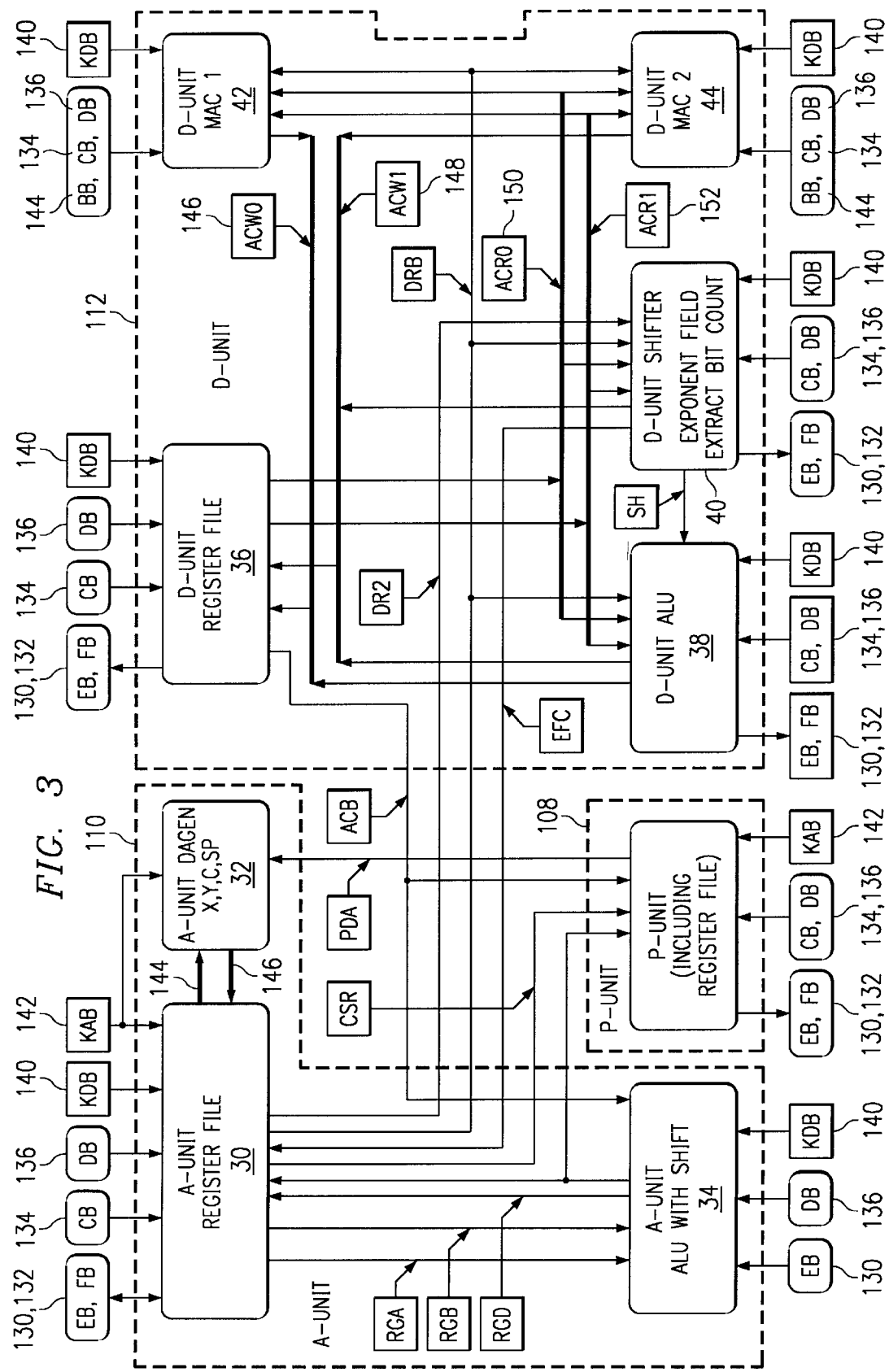
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and a address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0, ..., AR7) and data registers (DR0, ..., DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and a address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0, ..., AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
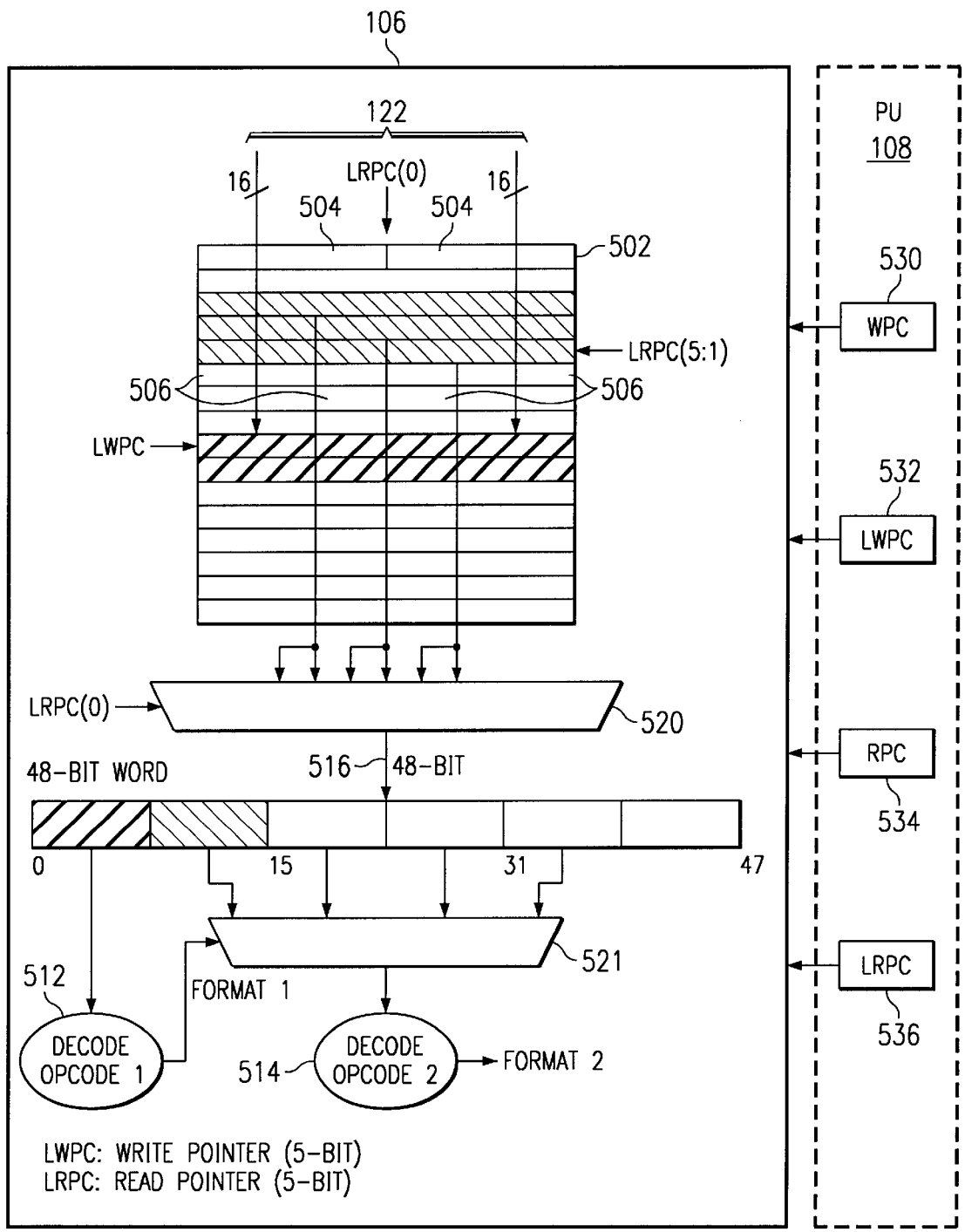
FIG. 4 is schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
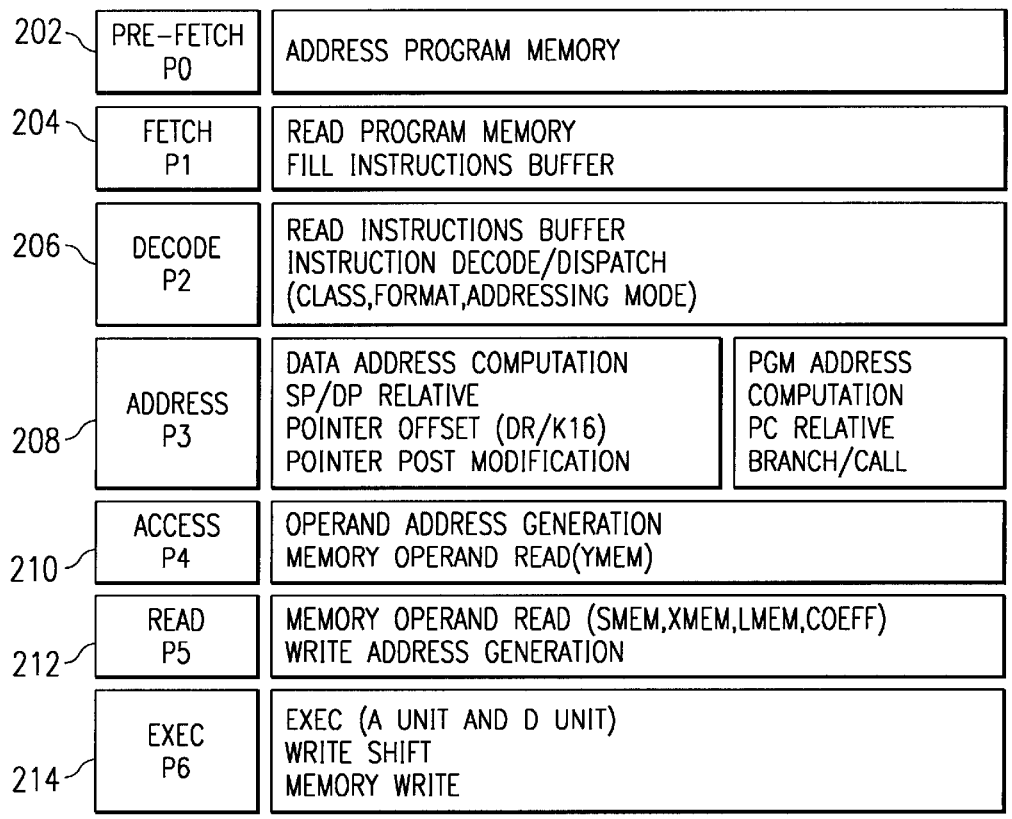
FIG. 5 is a representation of pipeline phases of the processor of FIG. 1.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
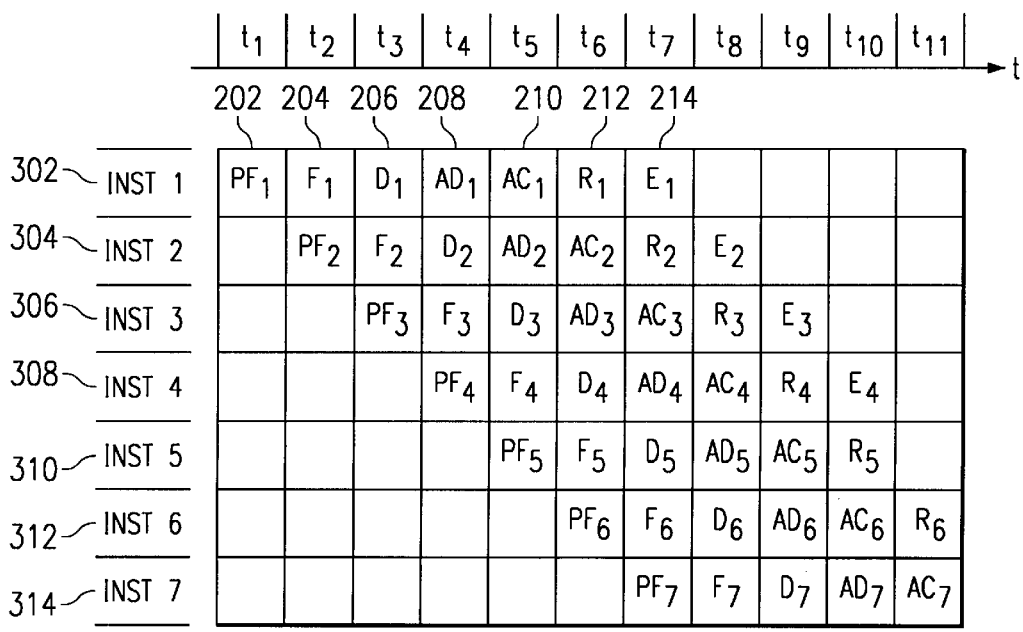
FIG. 6 is a diagrammatic illustration of an example of operation of a pipeline in the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. For all 7 instructions 302–314, FIG. 6 shows them all under process in time period $T_7$. Such a structure adds a form of parallelism to the processing of instructions.

Figure 7:
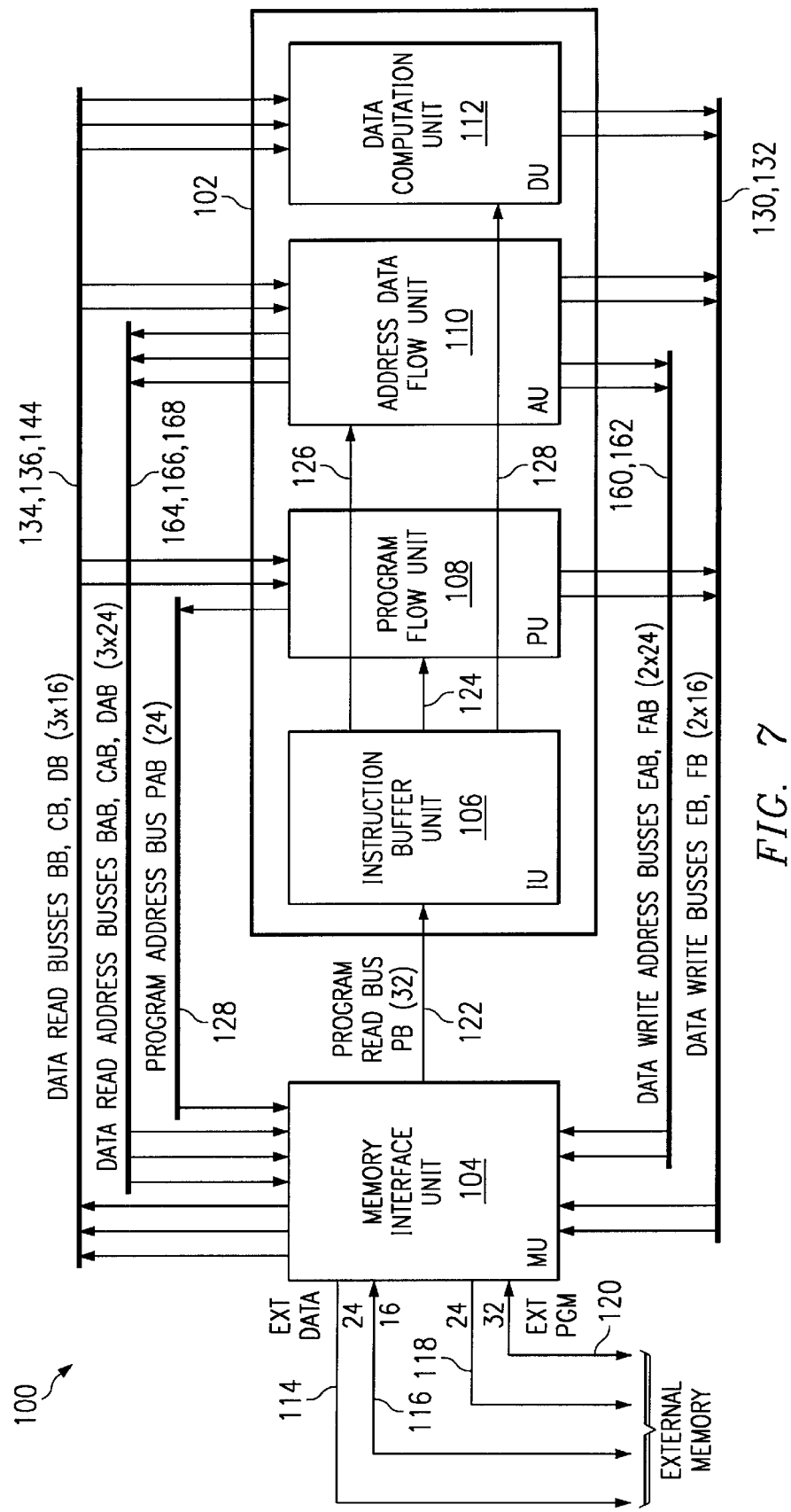
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bidirectional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

In a particular embodiment of the invention, the processing engine 100 is responsive to machine instructions in a number of formats. Examples of such instructions in different formats are illustrated in the following.

8 Bit Instruction: OOOO OOOO This represents an eight bit instruction, for example a memory map qualifier (MMAP( )) or a read port qualifier (readport( )). Such a qualifier comprises merely an eight bit opcode (OOOO OOOO). In such a case parallelism is implicit.

16 Bit Instruction: OOOO OOOE FSSS FDDD

This represents an example of a sixteen bit instruction, for example an instruction where the content of a destination register (e.g., dst) becomes the sum of the prior content of that register (dst) and the content of a source register (src), that is:

dst=dst+src

Such an instruction comprises a seven bit opcode (OOOO OOO) with a one bit parallel enable field (E), a four bit source register identifier (FSSS) and a four bit destination register identifier (FDDD).

16 Bit Instruction: OOOO FDDD PPPM MMMI

This represents another example of a sixteen bit instruction, for example where the content of a destination register (e.g., dst) becomes the content of a memory location (Smem), that is:

$$dst = Smem$$

Such an instruction comprises a four bit opcode (OOOO), a four bit destination register identifier (FDDD), a three bit pointer address (PPP), a four bit address modifier (M MMM) and a direct/indirect address indicator (I).

24 Bit Instruction: OOOO OOOE LLLL LLLL oCCC CCCC

This represents an example of a twenty four bit instruction, for example a conditional instruction for a branch to and offset (L8) where a condition is met, that is:

$$if(cond)\ goto\ L8$$

Such an instruction comprises a seven bit opcode (OOOO OOO) with a one bit parallel enable field (E), an eight bit branch offset (LLLL LLLL), a one bit opcode extension (o) and a seven bit condition field (CCC CCCC).

24 Bit Instruction: OOOO OOOO PPPM MMMI SSDD ooU%

This is another example of a twenty-four bit instruction, for example a single memory operand instruction where the content of an accumulator ($AC_y$) becomes the result of rounding the sum of the content of another accumulator ($AC_x$) and the square of the content of a memory location (with optional rounding), and optionally the content of a data register (DR3) can become the content of the memory location, that is:

$$AC_y = rnd(AC_x + (Smem * Smem))[, DR3 = Smem]$$

Such an instruction comprises an eight bit opcode (OOOO OOOO), a three bit pointer address (PPP), a four bit address modifier (M MMM), a one bit direct/indirect address indicator field (I), a two bit source accumulator identifier (SS), a two bit destination accumulator identifier (DD), a two bit opcode extension (oo), an update condition field (u), and a one bit rounding option field (%).

32 Bit Instruction: OOOO OOOO PPPM MMMI KKKK KKKK KKKK KKKK

This is an example of a thirty-two bit instruction, for example an instruction where the content of a test register (TC1) is set to 1 or 0 depending on the sign comparison of a memory location (Smem) to a constant value (K16), that is:

$$TC1 = (Smem == K16)$$

Such an instruction comprises an eight bit opcode (OOOO OOOO), a three bit pointer address (PPP), a four bit address modifier (M MMM), a one bit direct/indirect address indicator field (I) and a sixteen bit constant field (KKKK KKKK KKKK KKKK).

Bit manipulation instructions have the same format as a single memory instruction making a memory access. FIG. 8 illustrates an example of such an instruction. Examples of bit manipulation instructions are a bit test instruction, a bit set instruction, a bit clear instruction and a bit complement instruction. As shown in FIG. 8, a bit manipulation instruction 900 includes an operation field 902 for an operation code, an addressing field 904, and a data register select field 906. The addressing field of the instruction controls the address generation of the CPU independently of the executed instruction, as illustrated in Table 1, below.

TABLE 1

| Addressing mode | Instruction addressing field | Instruction examples |
|---|---|---|
| Direct addressing | This directly specifies the address of a bit to be extracted from a user defined register. It is a constant. | Bit(register, #bit address value) = 1 Cbit(register, #3) |
| Indirect addressing | This indirectly specifies the address of a bit to be extracted from a user defined register It designates a pointer-register and the modification to be made to it. | Bit(register, *AR1) = 0 TC1 = bit(register, *AR3+DR0) TC1.TC2 = bit(register, Pair(*AR2+%)) |

As mentioned in the introduction, the present invention relates to the computation of linear vectors in a digital processing system.

As described in the following, a particular embodiment of the invention uses instructions which perform an addition or subtraction depending upon the result of a bit test.

Several instruction formats of this type are illustrated in Table 2, below:

TABLE 2

ACy = adsc( Smem, src, TCx)
   if(TCx == 1)          ACy = ACx + Smem << #16
   else                     ACy = ACx − Smem << #16
ACy = adsc( Smem, src, TCx, TCy)
   if(TCy == 1)          ACy = ACx
   else   if(TCx == 1)  ACy = ACx − Smem << #16
          else           ACy = ACx − Smem << #16
ACy = adsc( Smem, src, DRx, TCx, TCy)
   if(TCy == 1)if(TCx == 1)  ACy = ACx + Smem << #16
          else           ACy = ACx − Smem << #16
   else   if(TCx == 1)  ACy = ACx + Smem << DRx
          else           ACy = ACx − Smem << DRx Note:
== indicates "equal to"
<< indicates "arithmetic shift"

FIG. 9 is a representation of a conventional implementation of a linear combination of vectors.

Firstly, the $(C_i)_{1 \leq i \leq N}$ coefficients are converted from a bit representation (0, 1) to fractional numbers (½, −½) coded on N bits in $2^n$ complement form. Then each $\vec{Y}$ vector coordinate $(Y_j)_{1 \leq j \leq M}$ is computed with an N step algorithm. The computation is effected with a Multiply and Accumulate unit, as represented by the following equation:

$$\forall\ 1 \leq j \leq M\ \ Y_j = \sum_{1 \leq i \leq N} ((C_i * X_{ij}) << 1),$$

where $(X_{ij})_{1 \leq j \leq M}$ are the coordinates of the vector $\vec{X}_i$.

FIG. 10 is an alternative representation of the linear combination of vectors as performed in accordance with an embodiment of the invention. In other words, in an embodiment of the invention, a linear combination of vectors is computed in accordance with the following equation:

$$\forall\, 1 \le j \le M \quad Y_j = \sum_{1 \le i \le N} (-(-1)^{C_i} * X_{ij})$$

Here a coefficient $C_i=0$ represents a multiplication by $-1$. As an alternative, however, a coefficient $C_i=0$ could represent a multiplication by $+1$, in accordance with the following equation:

$$Y_j = \sum_{1 \le i \le N} ((-1)^{C_i} * X_{ij})$$

$(C_i)_{1 \le i \le N}$ coefficients, represented as bits (0, 1), are packed in a CPU register and each $\vec{Y}$ vector coordinate is computed with a N+1 step algorithm with a bit test unit operating in parallel with an ALU unit.

At step $(i+1)_{1 \le i \le N}$ of the computation:
bit $C_{i+1}$ of the CPU register is addressed;
this bit is tested in a temporary register; and
a conditional add/subtract of $X_{ij}$ operand is performed.

Figure 11:
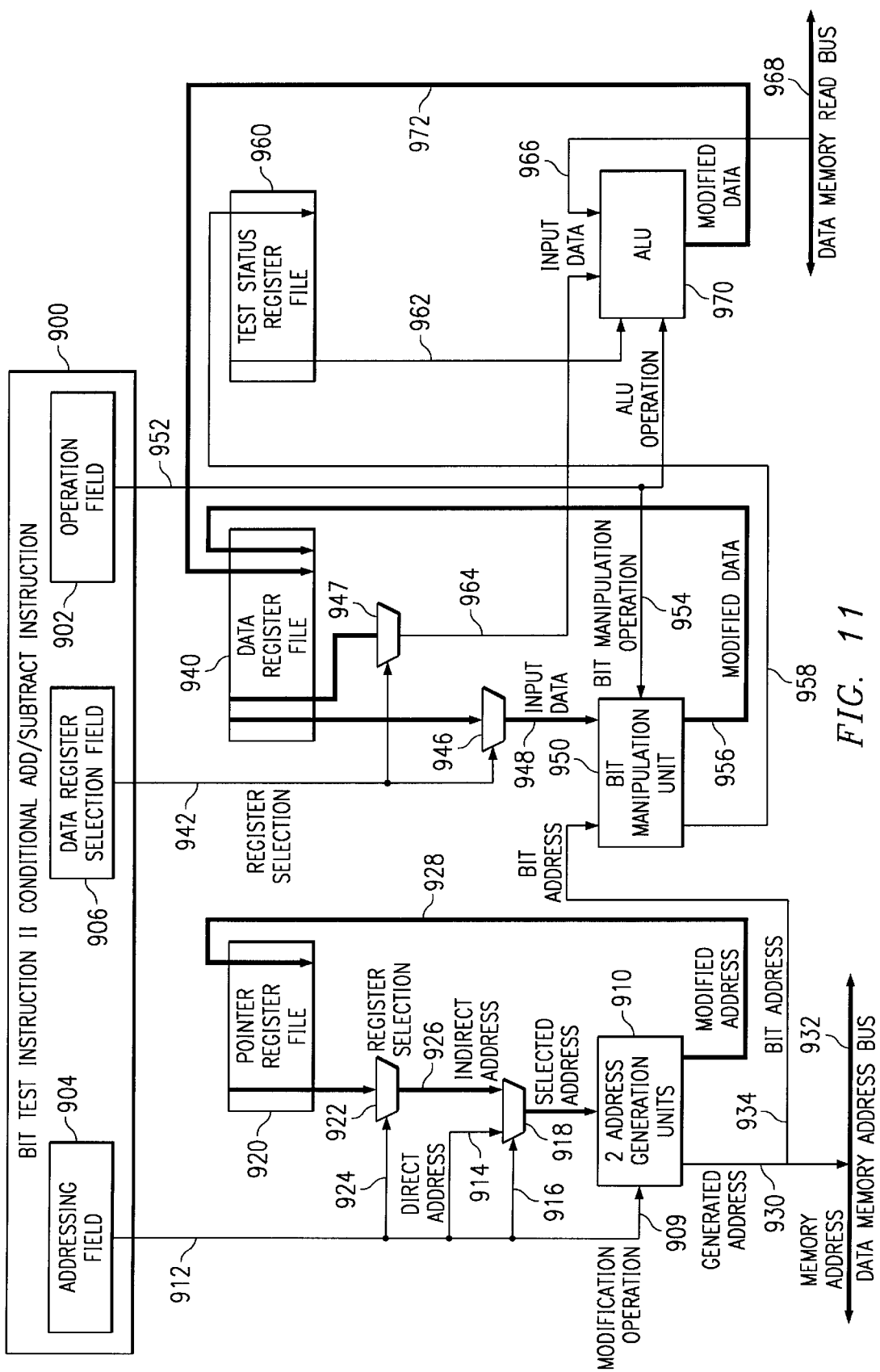
FIG. 11 is a schematic overview of elements of the processor of FIG. 1.

FIG. 11 is a schematic overview of the manner in which a compound instruction, specifically a bit test instruction in parallel with a conditional add/subtract instruction, is used to control the elements of the processing engine described with reference to FIG. 3 above.

It will be noted that the order of the fields in the instruction 900 in FIG. 11 has been modified with respect to FIG. 8 for ease of illustration.

The addressing field 904 contains two addresses, namely a bit address and a memory operand address.

The content of the address field 904 is supplied on lines 912 to first and second multiplexors 918 and 922 and also to address generation units 910 (which form part of the A-Unit DAGEN 32 of FIG. 3). A direct/indirect bit is supplied at 916 to the first multiplexor 918. The address bits are also supplied from lines 912 via lines 914 to the first multiplexor 918. Where the address is a direct address, as indicated by the direct/indirect address bit, the direct/indirect address bit supplied on line 916 enables the multiplexor 918 to select the direct address bits supplied on line 914. Where the address is an indirect address, the bits supplied on lines 924 to the second multiplexor 922 select the content of a register in a pointer register file 920. The input to the second multiplexor 922 is formed by lines 925 from the pointer register file 920. The content of the pointer register 920 (which can be one of the address pointer registers ARx[16] in the A-Unit register file 30 of FIG. 3) identified by the bits on lines 924 are supplied via an indirect address input 926 to the first multiplexor 918. In this case, the direct/indirect bit supplied on line 916 will select the indirect address input 926 to the multiplexor 918. As a result, the appropriate direct or indirect address is supplied to the address generation units 910. Modification operation bits supplied from the addressing field 904 are also supplied at 909 to the address generation unit 910. A modified address resulting from the modification operation is output on line 928 from the address generation units 910 for input to the pointer register file 920. Also output from the address generation units 910 is a generated address. The generated address on lines 930 are either supplied to a data memory address bus 932 where they relate to memory operands, or lines 934 to a bit manipulation unit 950 where they relate to a bit address. The address generation units 910 can be arranged to provide circular addressing with post modification. The same or different hardware can be used to generate the addresses for bit register addressing or for memory operand addressing.

The content of the data register selection field 906 is supplied to third and fourth multiplexors 946 and 947. The register selection bits supplied to the third multiplexor 946 enables selection of a data register 940 (which can be one of the data registers DRx[16] or ARx[16] of the A Unit register file 30 of FIG. 3) for output via lines 948 to the bit manipulation unit 950. This register will contain the coefficients $(C_i)_{1 \le i \le N}$. The register can be longer than is strictly needed for the coefficients (e.g., N+1 rather than N bits). This enables circular bit addressing with post modification to be employed for addressing the registers, with the coefficients being arranged to "wrap-round" the register. In other words, say the coefficients $(C_i)_{1 \le i \le N}$ are initially held at bits 1 to N of an N+1 bit register. Then, a first modified bit could be stored at bit position N, a second modified bit at bit position 1 (the previously stored bit at position 1 will already have been used in a previous step), and so on. The bit manipulation unit can form part of the A Unit ALU 34 of FIG. 3. To this end, a complement bit is fed back on path 956 from the bit manipulation unit 950 to the data register file 940. Bit manipulation operation bits are supplied to the bit manipulation unit 950 on lines 952 and 954 from the operation field 902 of the instruction 900. The output of the bit manipulation unit 958 is supplied to a test status register file 960 (which can be a test register TC1 or TC2 of the status register for the A Unit of FIG. 3). The register selection bits supplied from the data register selection field 906 on lines 942 are also supplied to the fourth multiplexor 947. This enables the selection of an output from an accumulator register file ACx[40] for selecting a partial coordinate $\vec{Y}_j$ of a vector $\vec{Y}$ for input via a path 964 to an ALU 970 (which can be the D Unit ALU 38 of FIG. 3). ALU operation bits are also supplied from the operation field 902 via lines 952. Also supplied to the ALU 970 are memory coordinates $X_{ij}$ supplied via a data memory read bus 968 and lines 966. Outputs from the test status register file 960, which contains the tested coefficient $C_i$ are supplied on lines 962 to the ALU 970. Modified data are output 972 from the ALU 970 to the data register file 940 for storage therein.

Figure 12:
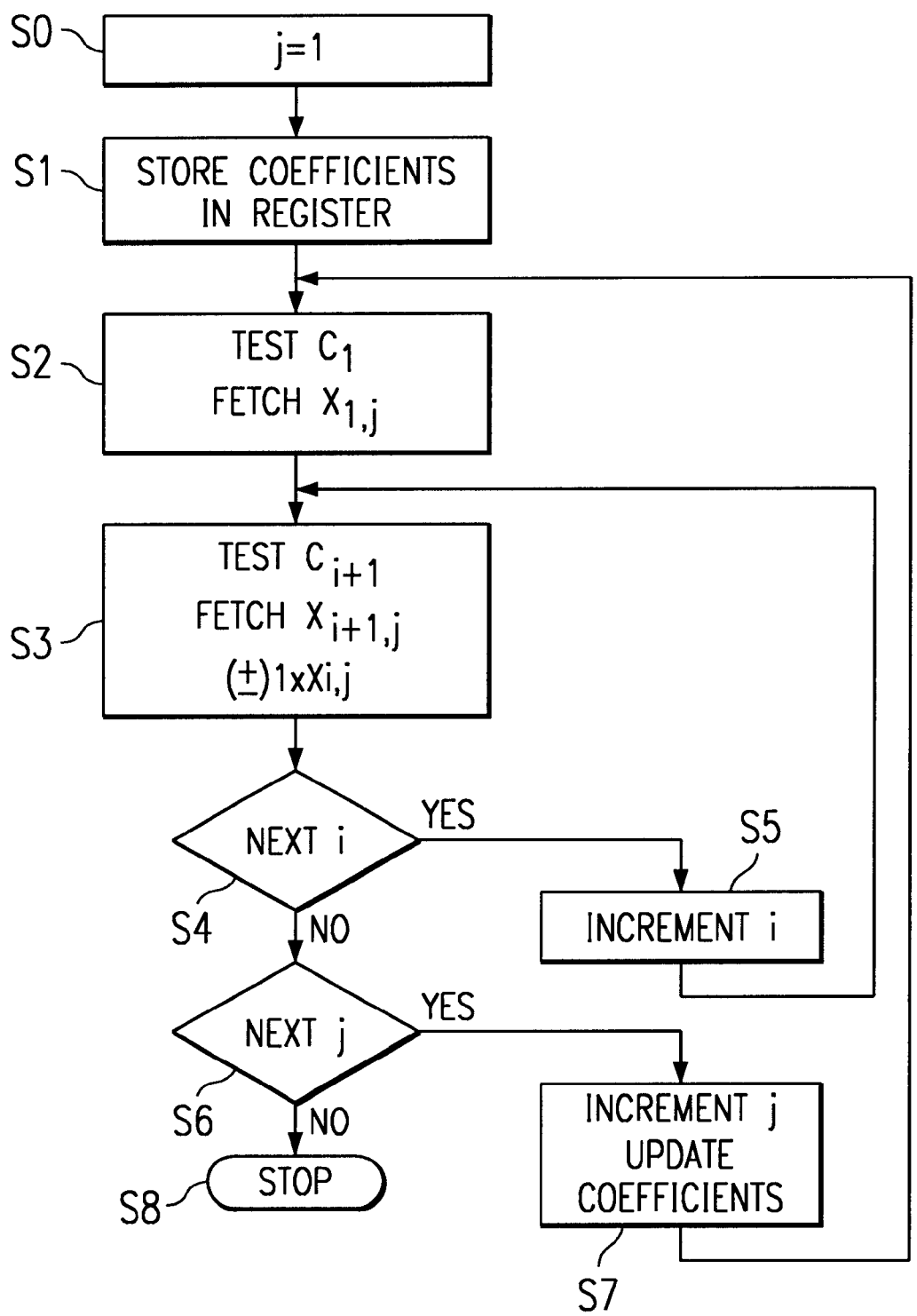
FIG. 12 is a schematic diagram illustrating the sequence of steps in a method of computation of a linear vector according to the invention.

FIG. 12 is a flow diagram illustrating the sequence of steps in a method of computation of a linear vectors. The various steps in the method will be explained with reference to FIG. 11.

In accordance with this method, each coordinate $\forall 1 \le j \le M$ of the vector $\vec{Y}$ is computed, one after the other.

At S0, the process starts for the first vector coordinate J=1.

At S1, the coefficients for a first input vector are stored in the data register file 940.

At S2, the first step (step i=1) of the process of computing that coordinate includes addressing bit $C_1$ in a data register 940 in the data register file 940, as determined by the address computation in the data address generation unit 910 using the register bit address information from the addressing field 904 of the instruction 900. This bit is tested and the result (in the present instance the tested bit value) is stored in the test status register file 960. The address for the first $x_{ij}$ memory operand is also generated in the address generation unit using the address information in the addressing field 904 of the instruction 900, and the fetch of that operand is performed.

At S3, this process is continued for step i+1, with the steps indicated at S2 being performed for bit $C_{i+1}$ and the operand fetch being initiated for operand $X_{i+1,j}$. In parallel, a conditional addition/subtraction of the $X_{ij}$ operand is performed. This is repeated via steps S4–S5 for i+1=2 to N of this process. Thus, in each iteration, bit $C_{i+1}$ in a data register in the data register file 940 is addressed, as determined by the address computation in the data generation unit 910 using the register bit address information from the addressing field 904 of the instruction 900. This bit is tested and the result (in the present instance the tested bit value) is stored in the test status register file 960. The address for the first memory operand is also generated in the address generation unit using the address information in the addressing field 904 of the instruction 900, and the fetch of that operand is performed. The conditional addition/subtraction of the operand $X_{ij}$ is also performed in the ALU 970. In the present instance operand value $X_{ij}$ is added if the tested bit value for $C_i$ stored in the previous step is one, and is subtracted if the tested bit value for $C_i$ stored in the previous step is zero. (It will be understood, of course, that in another embodiment a value other than the tested value for the bit could be stored in the bit status register file so that the determination of whether to add or subtract at the ALU could be different. However, the most straightforward approach is as described for this embodiment).

In other words, at each iteration for $(i+1)_{1 \le i \le N}$ of the computation:

bit $C_{i+1}$ of the CPU register is addressed;

this bit is tested in a temporary register; and a conditional add/subtract of $X_{ij}$ operand is performed.

At S4, if I<N, then I is incremented at S5 and control passes back to S3. Otherwise, if I=N, control passes to S6. In S6, the final conditional addition/subtraction of $X_{ij}$(I=N) is performed.

If at S6, further coordinates of the vector $\vec{Y}$ are to be computed (i.e. j<M), at S7 the complement feedback on path 956 will cause updating of the coefficients in the data register within the data register file 940. This can be achieved though circular bit addressing with post modification, as mentioned earlier. Also, the value of j is incremented and control passes back to S2.

If no further coordinates are to be computed, i.e. if j=M, the computation of the vector $\vec{Y}$ terminates at S8.

Thus this process is able to perform the computation:

$$\forall\, 1 \le j \le M \quad Y_j = \sum_{1 \le i \le N} (-(-1)^{C_i} * X_{ij})$$

FIG. 13 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

One application for a processing engine such as the processor 10, for example as incorporated in an integrated circuit as in FIG. 13, is in a telecommunications device, for example a mobile wireless telecommunications device. FIG. 14 illustrates one example of such a telecommunications device. In the specific example illustrated in FIG. 14, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Accordingly, there has been described a method, system and apparatus for efficiently computing a linear combination of two vectors. Although this has been described in the context of the a particular embodiment, it will be appreciated that the invention is not limited thereto and that many modifications/additions and/or substitutions may be made within the scope of the invention.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a processing engine for computing an output vector as a combination of N input vectors each having M coordinates, the processing engine comprising:

a coefficient register for holding a representation of N coefficients, such that for each of the N input vectors there is a corresponding coefficient included in the representation of coefficients, a test unit for testing selected parts of the coefficient register for each coefficient, and an arithmetic unit for computing coordinates of the output vector, wherein for each coordinate of the output vector the arithmetic unit is operable to combine the respective coordinates of the N input vectors by selective addition or subtraction of each coordinate dependent on the result of testing the corresponding coefficient to form a respective coordinate of the output vector.

2. The processing engine according to claim 1, further comprising at least one test status register for storage of a coefficient representation test result prior to selective addition/subtraction of an input vector coordinate dependent on the coefficient representation test result.

3. The processing engine according to claim 2 further comprising an address generator.

4. The processing engine according to claim 3, wherein the address generator generates a register bit address for selecting a part of the coefficient register for testing by the test unit.

5. The processing engine according to claim 4, wherein the register bit address addresses at least a bit field of at least one bit.

6. The processing engine according to claim 5, wherein the address generator effects circular bit addressing.

7. The processing engine according to claim 6, wherein the register is a selectable one of a plurality of registers.

8. The processing engine according to claim 7 wherein the address generator generates a memory address for retrieving an input vector coordinate.

9. The processing engine according to claim 8, operable to cause one memory operand corresponding to a coordinate of the first input vector to be fetched and one coefficient selected from the coefficient register to be tested in response to a single instruction processed by the processing engine.

10. The processing engine according to claim 9, wherein the test unit is a bit test unit and the arithmetic unit is an arithmetic logic unit.

11. The processing engine according to claim 10, wherein the test unit is operable to test bits of the register as representative of the coefficients.

12. The processing engine according to claim 1, wherein a bit test unit is operable in a step i+1 of a computation of a coordinate $\vec{Y}_j$ of an output vector $\vec{Y}$ to test a coefficient $C_{i+1}$ of the first input vector and the arithmetic unit is operable in parallel therewith to perform a conditional addition/subtraction of an coordinate $X_{ij}$ of the second input vector dependent upon the result of a test on a coefficient $C_i$ of the first input vector performed in a step i of the computation.

13. The digital system of claim 1 being a cellular telephone, further comprising:
   an integrated keyboard connected to the processor via a keyboard adapter;
   a display, connected to the processor via a display adapter;
   radio frequency (RF) circuitry connected to the processor; and
   an aerial connected to the RF circuitry.

14. A method of computing, in a processing engine, an output vector from a plurality of input vectors, each with M coordinates, the method comprising the steps of:
   holding a representation of each of N coefficients for each of N input vectors in a coefficient register;
   testing each coefficient; and
   computing coordinates of the output vector, wherein for each coordinate of the output vector the respective coordinates of the N input vectors are combined by selective addition or subtraction of each coordinate dependent on the result of testing a corresponding coefficient to form a respective coordinate of the output vector.

15. The method according to claim 14, further comprising the step of storing a coefficient representation test result prior to selective addition/subtraction of a coordinate of the input vector dependent on the coefficient representation test result.

16. The method according to claim 15, further comprising the step of generating a coefficient register address for selecting coefficients for testing by the test unit.

17. The method according to claim 16, further comprising the step of generating a memory address for retrieving a coordinate of the input vector.

18. The method according to claim 17, wherein the step of computing is performed in an iterative manner, wherein the steps of testing one coefficient in the coefficient register and fetching one coordinate of the input vector from are performed for each iteration of the computation step.

19. The method according to claim 18, further comprising the step of representing coefficients as bits.

20. The method according to claim 14, further comprising the step of iterating a computation such that $(i+1)_{1 \leq i \leq N}$, wherein the following steps are all performed in a parallel manner in response to a single instruction executed by the processing engine:
   addressing a bit $C_{i+1}$ representative of a coefficient in the coefficient register for testing that bit;
   storing a result of a tested bit in a bit test result register; and
   performing one of a conditional addition and subtraction of an $X_{ij}$ operand of an input vector dependent on a result stored in the bit test result register as a result of a test on a bit $C_i$ of the coefficient register performed at a step i of the computation.

* * * * *